United States Patent

Watanabe et al.

Patent Number: 5,360,889
Date of Patent: Nov. 1, 1994

[54] SOFT POLYCARBONATE RESIN

[75] Inventors: Haruo Watanabe; Tsuyoshi Sato, both of Kanagawa, Japan

[73] Assignee: Hodogaya Chemical Co., Ltd., Tokyo, Japan

[21] Appl. No.: 107,620

[22] Filed: Aug. 18, 1993

[30] Foreign Application Priority Data

Aug. 21, 1992 [JP] Japan .................................. 4-244070
Jul. 29, 1993 [JP] Japan .................................. 5-205616

[51] Int. Cl.$^5$ ............................................ C08G 64/00
[52] U.S. Cl. ............................ 528/371; 528/370; 528/196
[58] Field of Search ...................... 528/370, 371, 196

[56] References Cited

U.S. PATENT DOCUMENTS 4,628,081 12/1986 Mark et al. ........................... 528/176

FOREIGN PATENT DOCUMENTS 0000060 12/1978 European Pat. Off. .
0213465 3/1987 European Pat. Off. .

*Primary Examiner*—John Kight, III
*Assistant Examiner*—Terressa Mosley
*Attorney, Agent, or Firm*—Oblon, Spivak, McClelland, Maier & Neustadt

[57] ABSTRACT

A soft polycarbonate resin represented by formula (I):

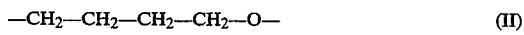

(I)

wherein A represents a polyether block consisting essentially of a structural unit represented by formula (II):

$$-CH_2-CH_2-CH_2-CH_2-O- \quad (II)$$

and a structural unit represented by formula (III):

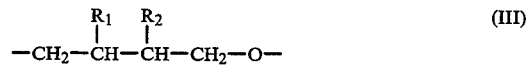

(III)

wherein one of $R_1$ and $R_2$ represents a hydrogen atom and the other represents a methyl group;

B represents a carbonate oligomer block represented by formula (IV):

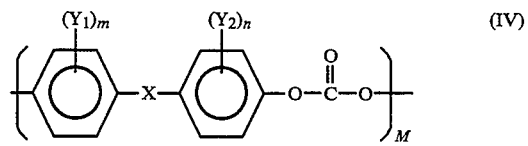

(IV)

wherein X represents at least one linking group selected from

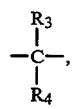

$-O-$, $-S-$, $-SO_2-$, $-SO-$, and

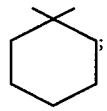

$R_3$ and $R_4$ each represents at least one of a hydrogen atom and a hydrocarbon group containing from 1 to 6 carbon atoms; $Y_1$ and $Y_2$ each represents at least one of a hydrogen atom, a halogen atom and a hydrocarbon group containing from 1 to 6 carbon atoms; m and n each represents 0 or an integer of from 1 to 4; and M represents an integer of from 1 to 10; and L represents an integer of from 7 to 30, said polyether block A being present in a proportion of from 20 to 50% by weight based on the polycarbonate resin and having a number average molecular weight of from 500 to 3000, and the structural unit represented by formula (III) being present in a proportion of from 5 to 35% by weight based on the polyether block A. The soft polycarbonate resin has a high tensile elongation and excellent low-temperature characteristics.

6 Claims No Drawings

SOFT POLYCARBONATE RESIN

FIELD OF THE INVENTION

This invention relates to a soft polycarbonate resin having a high tensile elongation, excellent low-temperature characteristics as well as transparency.

BACKGROUND OF THE INVENTION

Polycarbonate resins exhibit excellent transparency and high impact resistance and are widely utilized as electric or electronic parts and mechanical parts of appliances. In recent years, polycarbonate resins have contributed to creation of new materials called polymer blends or polymer alloys in combination with other resins.

Conventional polycarbonate resins for these uses have an elongation of about 100% in a tensile test though exhibiting plastic hardness. In order to obtain modified polycarbonate resins with further increased elongation, various improvements have been added to a process comprising copolymerization of an aromatic compound having crystallinity and an aliphatic compound having rubbery properties.

For example, processes for producing soft polycarbonate resins from bisphenol A or a bisphenol A block and polytetramethylene ether glycol were proposed as described in *Journal of Applied Polymer Science*, pp. 343–352 (1961) and *Journal of Polymer Science*, Part C, pp. 707–730 (1963). In connection to the similar reaction mode, reactivity of various aliphatic glycol compounds is studied in JP-A-49-133494 and JP-A-51-61597 (the term "JP-A" as used herein means an "unexamined published Japanese patent application"), and modified polycarbonate resins prepared by using polyethylene glycol or polytetramethylene ether glycol as an aliphatic compound are described in JP-A-56-36517, JP-A-60-94420, JP-A-62-11724, JP-A62-161825, and U.S. Pat. No. 3,287,442.

While these known modified polycarbonate resins have an increased tensile elongation as a mechanical property as compared with general polycarbonate resins, they have reduced strength only to provide moldings of low strength.

Further, polycarbonate resins are frequently used as a modifier for improving impact resistance of other resins. Polycarbonate resins for such use are also required to have well-balanced mechanical strength and elongation.

The conventional soft polycarbonate resin obtained from bisphenol A and polytetramethylene ether glycol has poor mechanical properties at low temperatures due to its high glass transition temperature. Therefore, it is unsuitable for use in a low temperature environment, for example, as a constructive material.

SUMMARY OF THE INVENTION

An object of the present invention is to provide a soft polycarbonate resin having an increased tensile elongation while retaining mechanical strength and also having excellent low-temperature characteristics.

The present inventors have extensively studied aliphatic compounds giving influences to softness of polycarbonate resins. They found as a result that incorporation of a polyether block having a specific structure into a polycarbonate resin structure provides a soft polycarbonate resin having an increased elongation without causing reduction of mechanical strength and also satisfying low-temperature characteristics. The present invention has been completed based on this finding.

The present invention relates to a soft polycarbonate resin represented by formula (I):

wherein A represents a polyether block consisting essentially of a structural unit represented by formula (II):

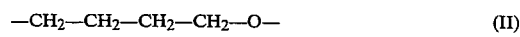

and a structural unit represented by formula (III):

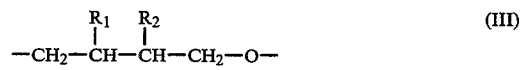

wherein one of $R_1$ and $R_2$ represents a hydrogen atom and the other represents a methyl group;

B represents a carbonate oligomer block represented by formula (IV):

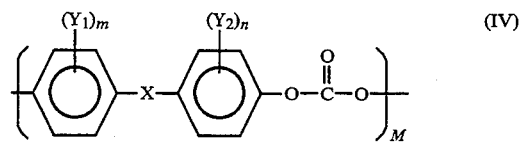

wherein X represents at least one linking group selected from

—O—, —S—, —SO$_2$—, —SO—, and

$R_3$ and $R_4$ each represents at least one of a hydrogen atom and a hydrocarbon group containing from 1 to 6 carbon atoms; $Y_1$ and $Y_2$ each represents at least one of a hydrogen atom, a halogen atom and a hydrocarbon group containing from 1 to 6 carbon atoms; m and n each represents zero or an integer of from 1 to 4; and M represents an integer of from 1 to 10; and L represents an integer of from 7 to 30, said polyether block A being present in a proportion of from 20 to 50% by weight based on the polycarbonate resin and having a number average molecular weight of from 500 to 3000, and the structural unit represented by formula (III) being present in a proportion of from 5 to 35% by weight based on the polyether block A.

DETAILED DESCRIPTION OF THE INVENTION

Polyether block A is a copolymer block consisting essentially of structural units (II) and (III), the unit (III)

content being from 5 to 35% by weight. Unit (III) is a repeating unit derived from 3-methyltetrahydrofuran by its ring cleavage, which is a mixture of two types of units different in the position of substitution with a methyl group from each other due to the difference in the position of the cleavage.

Carbonate oligomer block B is a unit composed of 1 to 10 diphenyl structure linked through a carbonate bond. The diphenyl structure is composed of two phenylene groups connected via a linking group represented by X. The plural linking groups X in block B may be the same or different.

The soft polycarbonate resin according to the present invention may comprise one species of the same molecular structure or may be a mixture of different molecular species.

The soft polycarbonate resin of the present invention is represented by formula (I), in which the number of repeated alternating block polycarbonate units (L) is from 7 to 30, and preferably from 10 to 20. If the number L is less than 7, the polycarbonate resin has considerably reduced mechanical properties, particularly breaking strength, withstanding no use. If it exceeds 30, the polycarbonate resin has an increased melt viscosity and poor moldability.

The proportion of polyether block A in formula (I) is from 20 to 50% by weight, and preferably from 35 to 50% by weight. If it is less than 20%, the polycarbonate resin has reduced impact resistance, though having improved hardness, and is of no use as a modifier. If it exceeds 50%, the polycarbonate resin has a decreased heat distortion temperature and reduced solvent resistance only to find limited use.

While the soft polycarbonate resin of the present invention may be prepared by any known process, it is preferably prepared by a process comprising dissolving a carbonate oligomer represented by formula (VI):

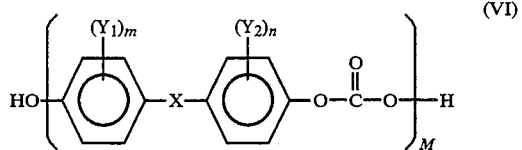

wherein X, $Y_1$, $Y_2$, m, n, and M are as defined above, in a solvent, e.g., dichloromethane, and reacting the solution with a polyether consisting essentially of the structural units (II) and (III) with its terminal hydroxyl group having previously been chloroformated with phosgene in the presence of an acid scavenger in any known process.

The carbonate oligomer of formula (VI) can be synthesized by a known process comprising dissolving an aromatic dihydroxy compound represented by formula (V):

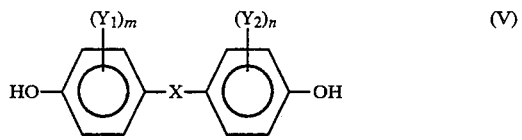

wherein X, $Y_1$, $Y_2$, m, and n are as defined above, in a solvent, e.g., dichloromethane, adding an acid scavenger, and introducing phosgene or liquefied phosgene into the solution, and precipitating the produced carbonate oligomer from methanol weighing about 10 times the carbonate oligomer at room temperature, as disclosed, for example, in M. Matsugane et al., *Plastic Zairyo Koza*, Vol. 5, pp. 66 et seq., (Process for producing polycarbonate resin - phosgene method), published by Nikkan Kogyo Shinbun Sha.

The reaction between the carbonate oligomer (VI) and the chloroformate-terminated polyether is carried out as follows. The carbonate oligomer (VI) is dissolved in a solvent, e.g., dichloromethane, and an acid scavenger is added to the solution. The chloroformate-terminated polyether is added dropwise to the carbonate oligomer solution at a temperature of from 5° to 10° C., and the mixture is allowed to react at 15° to 25° C. for 3 to 6 hours. The produced polymer is precipitated from methanol weighing about 10 times the polymer at room temperature.

Suitable acid scavengers which can be used In reaction include tertiary amines, e.g., trimethylamine, triethylamine and tripropylamine, and pyridine. The reaction may be carried out in the presence of a small amount of an alkaline aqueous solution.

The solvent which can be used in the reaction is not particularly restricted as long as it is capable of dissolving both the aromatic dihydroxy compound represented by formula (V) and the polyether consisting essentially of structural units (II) and (III). Examples of suitable solvents include chlorinated hydrocarbons, e.g., tetrachloroethane, trichloroethane, dichloromethane, dichloroethane, dichloroethylene, trichloroethylene, chloroform, and chlorobenzene; and cyclic oxy compounds, e.g., dioxane and tetrahydrofuran.

Examples of suitable aromatic dihydroxy compound represented by formula (V) include bis(4-hydroxyphenyl)alkanes, such as 2,2-bis-(4-hydroxyphenyl)propane (bisphenol A), bis(4-hydroxyphenyl)methane, 2,2-bis-(4-hydroxy-3,5-dimethylphenyl)propane, 1,1-bis-(4-hydroxyphenyl)butane, 3,3-bis-(4-hydroxyphenyl)pentane, and 1,1-bis-(4-hydroxyphenyl)cyclohexane; halogen-containing bisphenols, such as 2,2-(3,5,3',5'-tetrachloro-4,4'-dihydroxydiphenyl)propane and 2,2-(3,5-dichloro-4,4'-dihydroxydiphenyl)propane; and other bisphenols or hydroquinones, e.g., 4,4'-dihydroxydiphenyl sulfone, 4,4'-dihydroxydiphenyl sulfoxide, and 4,4'-dihydroxydiphenyl ether.

The number of repeated carbonate oligomer blocks (M) in formulae (IV) and (VI) is from 1 to 10, and preferably from 2 to 10. If M exceeds 10, molded articles obtained from the polycarbonate resin are liable to undergo dimensional change due to large strain depending on temperature.

Polyether block A comprising structural units (II) and (III) is a random copolymer polyether of tetrahydrofuran (hereinafter abbreviated as THF) and 3-methyltetrahydrofuran (hereinafter abbreviated as MTHF). Polyether block A can be prepared by a known process for preparing polytetramethylene ether glycol or the process disclosed in JP-A-63-235320 (corresponding to U.S. Pat. No. 4,960,849). More specifically, THF and MTHF are mixed at a molar ratio of from 95/5 to 40/60, and the mixture is subjected to ring-opening copolymerization in the presence of a polymerization initiator, such as a protonic acid (e.g., $HClO_4$, $HSO_3F$, $HSO_3Cl$ or $HBF_4$), an ion complex (e.g., $(CH_3CH_2)_3OBF_4$, $CH_3COSbCl_6$ or $C_6H_5N_2PF_6$), $CH_3COCl$—$BF_3$, $SOCl_2$—$AlCl_3$, $POCl_3$—$FeCl_3$, etc., either alone or in combination with an acid anhydride or an accelerator.

The thus prepared random copolyether consisting essentially of structural units (II) and (III) has a number average molecular weight of from 500 to 3000, and preferably from 500 to 2000. If the number average molecular weight is less than 500, the resulting polycarbonate resin has not only reduced softness but also reduced elongation, one of the targets of the present invention. If it exceeds 3000, the resulting polycarbonate resin has a decreased melting point and undergoes change from hard plastic properties to soft elastomeric properties, resulting in a reduction in strength.

The content of unit (III) in polyether block A is from 5 to 35% by weight, and preferably from 8 to 20% by weight. If it is less than 5%, the resulting polycarbonate resin is no more distinguishable from the conventional polycarbonate resin prepared from polytetramethylene ether glycol and an aromatic dihydroxy compound in terms of mechanical strength and elongation. If the unit (III) content exceeds 35%, the softening point and melting point of the polycarbonate resin will decrease, causing reduction in physical properties, such as room-temperature hardness and strength.

The present invention will now be illustrated in greater detail with reference to Examples and Test Examples, but the present invention should not be construed as being limited thereto. All the percents and ratios are by weight unless otherwise indicated.

Preparation of Carbonate Oligomer:

In a 1 l four-necked reactor equipped with a stirrer, a tube filled with silica gel, a thermometer, and a dropping funnel were charged 102.8 g (0.45 mol) of bisphenol A, 58.9 g (0.75 mol) of pyridine, and 300 ml of dichloromethane. The mixture was kept at 5° to 7° C. with stirring to dissolve bisphenol A. To the solution was added dropwise 34.8 g (0.35 mol) of liquefied phosgene through the dropping funnel over 30 minuets, and the mixture was allowed to react for 3 hours while stirring. The reaction mixture was washed with water to remove pyridine hydrochloride and poured into 1000 ml of methanol at room temperature. The thus precipitated crystal was thoroughly washed with water and methanol and dried to obtain 97.7 g of a carbonate oligomer. The resulting carbonate oligomer was designated BA-1.

BA-1 had a number average molecular weight (hereinafter abbreviated as Mm) of 840 as determined from the hydroxyl value calculated from the acetylation.

Carbonate oligomer BA-2 having an Mn of 1326 was prepared in the same manner as for BA-1, except for appropriately adjusting the amounts of bisphenol A, pyridine and liquefied phosgene.

Preparation of Polyether:

In a 1 l four-necked separable flask equipped with a stirrer, a thermometer, and a nitrogen sealing device were charged 281.2 g (3.9 mol) of dehydrated THF and 94.7 g (1.1 mol) of MTHF (THF/MTHF molar ratio=78/22), and 10.5 g of 70% perchloric acid and 95 g of acetic anhydride were added thereto at 10° C., followed by allowing the mixture to react for 6.5 hours. After completion of the reaction, the reaction mixture was neutralized with 500 g of a 20% sodium hydroxide aqueous solution. The neutralized reaction mixture was further worked-up in a known manner for recovery of unreacted monomers, hydrolysis, and purification to yield 276 g of a copolyether. The resulting copolyether had a hydroxyl value of 118.1 and an Mn of 950. The 3-methyltetramethylene ether group content in the copolyether was found to be 16% from the results of $^{13}$C-NMR analysis using FX-60 manufactured by Japan Electron Optics Lab. Co., Ltd.

The hydroxyl value (mg-KOH/g) of the copolyether polyol was obtained by a pyridine-acetic anhydride method, from which an Mn was obtained.

Chloroformation of Polyether:

A hundred grams (0.105 mol) of the above-prepared copolyether (Mn: 950; 3-methyltetramethylene ether group content: 16%) were dissolved in 500 g of dichloromethane, and 22.9 g (0,230 mol) of phosgene was bubbled therethrough over about 2 hours at the solution temperature of not higher than 10° C. After completion of bubbling, the reaction was continued for 4 hours while maintaining the solution temperature at 30° to 40° C. The reaction mixture was washed with water, dehydrated, and dried to remove hydrogen chloride gas and the solvent to obtain 112 g of a chloroformate-terminated copolyether having an Mn of 1009 and a 3-methyltetramethylene ether group content of 15%. The resulting chloroformate-terminated copolyether was designated GLC-2.

Chloroformate-terminated copolyether GLC-1 having an Mn of 750 and a 3-methyltetramethylene ether group content of 15% was prepared in the same manner as for GLC-2, except for appropriately adjusting the amounts of perchloric acid and acetic anhydride, etc.

EXAMPLE 1

In a 1 l four-necked reactor equipped with a stirrer, a tube filled with silica gel, a thermometer, and a dropping funnel were charged 84 g (0.1 mol) of BA-1, 17.5 g (0.22 mol) of pyridine, and 500 ml of dichloromethane, followed by stirring while maintaining the solution temperature at 7° to 10° C. to dissolve BA-1. To the BA-1 solution was added dropwise 75 g (0.1 mol) of GLC-1 from the dropping funnel over 40 minutes. After the addition, the reaction was continued at 15° to 20° C. for 3 hours. The reaction mixture was washed with water to remove pyridine hydrochloride and poured into 1000 ml of methanol at room temperature. The thus precipitated polymer was pulverized, thoroughly washed with water and methanol, and dried to obtain 105 g of a white polymer.

The resulting polymer had an intrinsic viscosity $[\eta]$ of 0.68 in dichloromethane. The IR spectrum of the polymer in dichloromethane showed an absorption assigned to a carbonate bond at 1760 cm$^{-1}$ and an absorption assigned to a phenolic hydroxyl group at 3400 to 3500 cm$^{-1}$.

The glass transition temperature (Tg) of the polymer as measured with a differential scanning calorimeter (DSC) and the mechanical characteristics of a cast film obtained from a dichloromethane solution of the polymer are shown in Table 1 below.

EXAMPLE 2

In the same manner as in Example 1, 0.05 mol of BA-2 and 0.05 mol of GLC-2 to obtain 108 g of a white polymer. The resulting polymer had an intrinsic viscosity $[\eta]$ of 0.79 in dichloromethane. The Tg of the polymer as measured with a DSC and the mechanical characteristics of a cast film obtained from a dichloromethane solution of the polymer are shown in Table 1.

EXAMPLE 3

In the same manner as in Example 1, 0.04 mol of BA-2 and 0,038 mol of GLC-2 to obtain 80 g of a white polymer. The resulting polymer had an intrinsic viscosity [η] of 0.89 in dichloromethane. The Tg of the polymer as measured with a DSC and the mechanical characteristics of a cast film obtained from a dichloromethane solution of the polymer are shown in Table 1.

Comparative Example 1

In the same manner as in Example 1, 0.1 mol of BA-1 and 0.1 mol of a chloroformate-terminated polytetramethylene ether glycol having an Mn of 750 (hereinafter referred to as PGC-1) to obtain 102 g of a white polymer. The resulting polymer had an intrinsic viscosity [η] of 0.65 in dichloromethane. The Tg of the polymer as measured with a DSC and the mechanical characteristics of a cast film obtained from a dichloromethane solution of the polymer are shown in Table 1.

Comparative Example 2

In the same manner as in Example 1, 0.1 mol of BA-2 and 0.1 mol of a chloroformate-terminated polytetramethylene ether glycol having an Mn of 1050 (hereafter referred to as PGC-2) to obtain 155 g of a white polymer. The resulting polymer had an intrinsic viscosity [η] of 0.70 in dichloromethane. The Tg of the polymer as measured with a DSC and the mechanical characteristics of a cast film obtained from a dichloromethane solution of the polymer are shown in Table 1.

TABLE 1

| Example No. | Carbonate Oligomer (a) | Chloroformate-terminated Polyether (b) | (a)/(b) Molar Ratio | Intrinsic Viscosity[1] | Melting Point (°C.) | Tg[2] (°C.) | Breaking Strength[3] (kg/cm$^2$) | Elongation at Break[4] (%) |
|---|---|---|---|---|---|---|---|---|
| Example 1 | BA-1 | GLC-1 | 1.00 | 0.68 | 200 | −67 | 600 | 450 |
| Example 2 | BA-2 | GLC-2 | 1.00 | 0.79 | 210 | −65 | 650 | 400 |
| Example 3 | BA-2 | GLC-2 | 1.05 | 0.89 | 210 | −60 | 720 | 300 |
| Compar. Example 1 | BA-1 | PGC-1 | 1.00 | 0.65 | 190 | −35 | 200 | 450 |
| Compar. Example 2 | BA-2 | PGC-2 | 1.00 | 0.70 | 200 | −33 | 450 | 300 |

Note:
[1] Measured at 20° C. in dichloromethane
[2] Measured with DSC-8230 manufactured by Rigaku K.K.
[3], [4] Measured according to JIS K-7113

As is apparent from the results in Table 1, the soft polycarbonate resin according to the present invention exhibits high breaking strength and high elongation at break in good balance as compared with the conventional polycarbonate resin prepared from polytetramethylene ether glycol and a carbonate oligomer of an aromatic dihydroxy compound as prepared in Comparative Examples 1 and 2. In addition, the soft polycarbonate resin of the present invention has a lower glass transition temperature and thereby exhibits a higher breaking strength and a higher elongation in low temperatures as compared with the conventional polycarbonate resins.

Test Example 1

A 1:1 mixture of the soft polycarbonate resin obtained in Example 3 (η=0.89) and a pelletized polystyrene resin (Polystyrene GP-1 produced by Denki Kagaku Co., Ltd.) was melt-kneaded in a mixing extruder (CS-194 manufactured by Custom Scientific Instrument (hereinafter referred to as CSI), Inc.) at a cylinder temperature of 180° C. and extruded at a die temperature of 190° C. into a rod and pelletized. The pellets were molded in an injection molding machine (CS-183 manufactured by CSI, Inc.) at a mold temperature of 70° to 80° C. and a cylinder temperature of 170° to 200° C. to prepare test specimens comprising a polystyrene/soft polycarbonate polymer blend.

Comparative Test Example 1

A 1:1 mixture of Polystyrene GP-1 (pellets) and a soft polycarbonate resin having an intrinsic viscosity of 0.72 as measured at 20° C. in dichloromethane which was synthesized from a carbonate oligomer prepared from bisphenol A (Mn: 1030) and a chloroformate-terminated polytetramethylene ether glycol (Mn: 980) was melt-kneaded to obtain test specimens in the same manner as in Test Example 1.

Comparative Test Example 2

Polystyrene GP-1 was melt-extruded in the same manner as in Test Example 1 to prepare test specimens.

A tensile test was conducted on each specimen prepared in Test Example 1 and Comparative Test Examples 1 and 2. The results obtained are shown in Table 2 below.

TABLE 2

| Test Example No. | Breaking Strength[1] (kg/cm$^2$) | Elongation at Break[2] (%) |
|---|---|---|
| Test Example 1 | 530 | 45 |
| Comparative Test Example 1 | 470 | 12 |
| Comparative Test Example 2 | 340 | 10 |

Note: [1], [2] Measured according to JIS K-7113

It is seen from Table 2 that the soft polycarbonate resin according to the present invention is effective as a modifier for other resins to improve mechanical properties, such as breaking strength and elongation at break.

The soft polycarbonate resin according to the present invention comprising a specific polyether block and a carbonate oligomer block at a specific proportion retains high strength and elongation even in low temperatures. Therefore, it is useful as various structural materials or electric or electronic parts. Further, it is suitable as an impact modifier for various other resins.

While the invention has been described in detail and with reference to specific examples thereof, it will be apparent to one skilled in the art that various changes and modifications can be made therein without departing from the spirit and scope thereof.

What is claimed is:
1. A soft polycarbonate resin represented by formula (I):

$$HO(A-\overset{\overset{O}{\|}}{C}-O-B)_L H \quad (I)$$

wherein A represents a polyether block consisting essentially of a structural unit represented by formula (II):

$$-CH_2-CH_2-CH_2-CH_2-O- \quad (II)$$

and a structural unit represented by formula (III):

$$-CH_2-\overset{\overset{R_1}{|}}{CH}-\overset{\overset{R_2}{|}}{CH}-CH_2-O- \quad (III)$$

wherein one of $R_1$ and $R_2$ represents a hydrogen atom and the other represents a methyl group;

B represents a carbonate oligomer block represented by formula (IV):

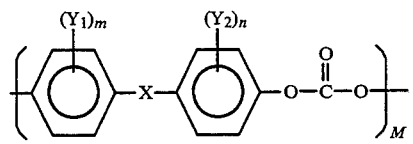

wherein X represents at least one linking group selected from $$-\overset{\overset{R_3}{|}}{\underset{\underset{R_4}{|}}{C}}-,$$

—O—, —S—, —SO$_2$—, —SO—, and

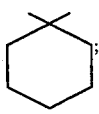

$R_3$ and $R_4$ each represents at least one of a hydrogen atom and a hydrocarbon group containing from 1 to 6 carbon atoms; $Y_1$ and $Y_2$ each represents at least one of a hydrogen atom, a halogen atom and a hydrocarbon group containing from 1 to 6 carbon atoms; m and n each represents zero or an integer of from 1 to 4; and M represents an integer of from 1 to 10; and L represents an integer of from 7 to 30, said polyether block A being present in a proportion of from 20 to 50% by weight based on the polycarbonate resin and having a number average molecular weight of from 500 to 3000, and the structural unit represented by formula (III) being present in a proportion of from 5 to 35% by weight based on the polyether block A.

2. A soft polycarbonate resin as claimed in claim 1, wherein L is 10 to 20.

3. A soft polycarbonate resin as claimed in claim 1, wherein the proportion of said polyether block A is from 35 to 50% by weight based on the polycarbonate resin.

4. A soft polycarbonate resin as claimed in claim 1, wherein the proportion of said structural unit represented by formula (III) is from 8 to 20% by weight based on the polyether block A.

5. A soft polycarbonate resin as claimed in claim 1, wherein the number average molecular weight of said polyether block A is from 500 to 2000.

6. A soft polycarbonate resin as claimed in claim 1, wherein M is 2 to 10.

* * * * *